United States Patent
Zhou

(10) Patent No.: US 7,775,503 B2
(45) Date of Patent: Aug. 17, 2010

(54) PRESSURE RELIEF VALVE

(75) Inventor: Quanbao Zhou, Rugby (GB)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 11/837,783

(22) Filed: Aug. 13, 2007

(65) Prior Publication Data
US 2008/0054204 A1 Mar. 6, 2008

(30) Foreign Application Priority Data
Sep. 2, 2006 (GB) .................. 0617369.4

(51) Int. Cl.
*F16K 31/00* (2006.01)
(52) U.S. Cl. .......................... 251/83; 251/63.5; 251/25; 137/523
(58) Field of Classification Search ........... 251/25, 251/28, 62, 63, 63.5, 82, 83; 137/522, 523
See application file for complete search history.

(56) References Cited

U.S. PATENT DOCUMENTS

| 378,609 | A | * | 2/1888 | Moore | 251/28 |
|---|---|---|---|---|---|
| 442,492 | A | * | 12/1890 | Ord | 251/28 |
| 888,062 | A | * | 5/1908 | Krichbaum | 110/331 |
| 962,551 | A | * | 6/1910 | Conrader | 251/28 |
| 1,324,705 | A | * | 12/1919 | Wainwright | 251/28 |
| 2,778,378 | A | * | 1/1957 | Presnell | 137/469 |
| 2,890,715 | A | * | 6/1959 | Ebersold | 137/494 |
| 4,145,025 | A | | 3/1979 | Bergeron | |
| 4,838,306 | A | * | 6/1989 | Horn et al. | 137/522 |
| 5,174,335 | A | * | 12/1992 | Iwabuchi | 137/624.18 |
| 6,116,272 | A | | 9/2000 | Kratzet | |
| 6,186,750 | B1 | | 2/2001 | Hunter | |

* cited by examiner

Primary Examiner—John K Fristoe, Jr.
(74) Attorney, Agent, or Firm—Allan J. Lippa; Alleman Hall McCoy Russell & Tuttle LLP

(57) ABSTRACT

An oil pressure relief valve for use in the lubrication system of an internal combustion engine is controlled by both pump outlet pressure 3 and pilot pressure 2. The action of the valve reduces the start-up pressure spikes associated with known pilot-operated valves, while also permitting a fuel economy benefit.

12 Claims, 1 Drawing Sheet

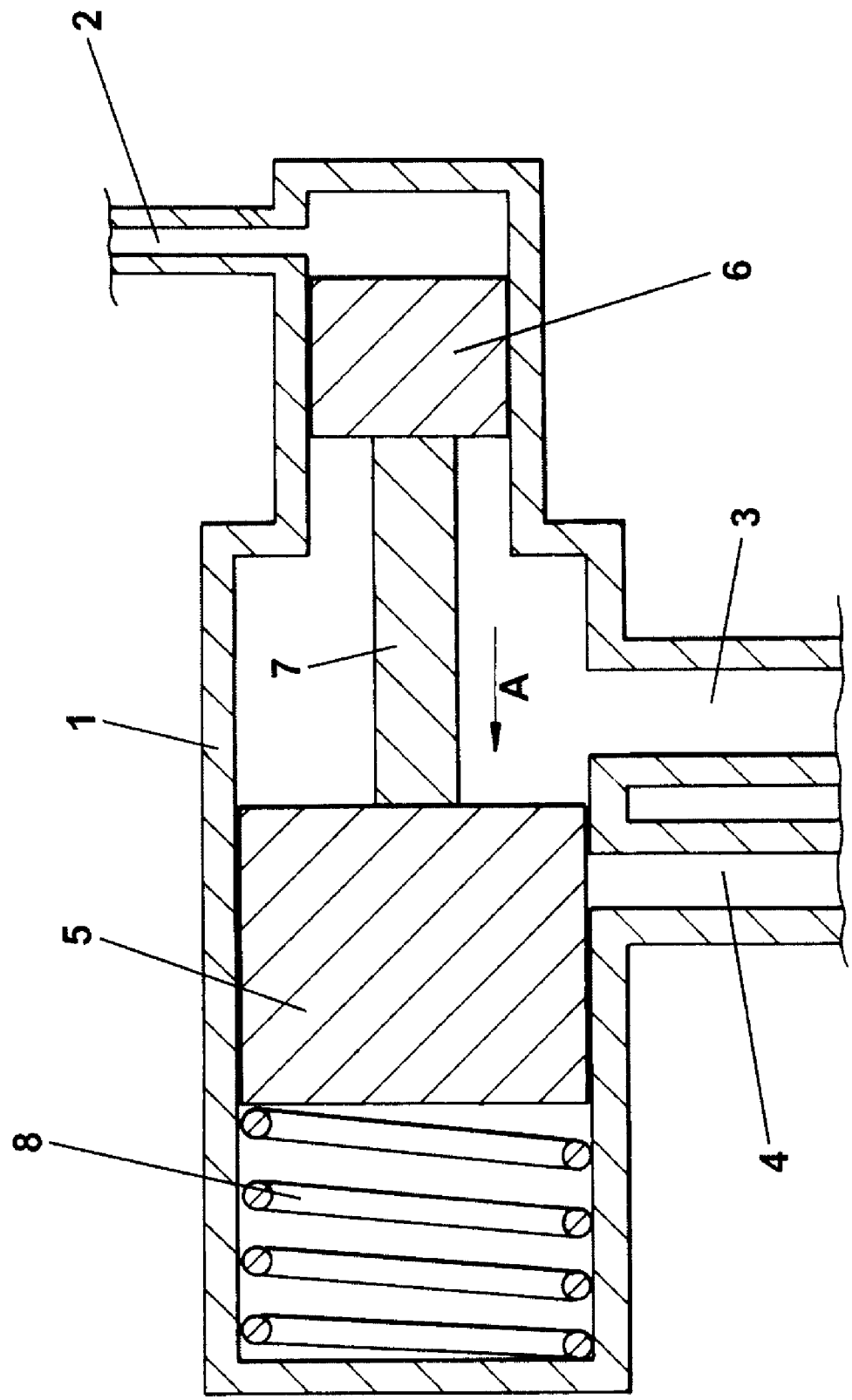

PRESSURE RELIEF VALVE

FIELD OF THE INVENTION

The present invention relates to pressure relief valves, particularly having application in a lubrication system of an internal combustion engine.

BACKGROUND AND SUMMARY

Such systems employ an oil pump, driven by the engine, for ensuring sufficient circulation of oil. While a deprivation of oil can result in damage to engine components, over-pressurisation is also undesirable. For example, too high an oil pressure can destroy paper filter elements. To prevent over-pressurisation, lubrication systems are provided with pressure relief valves. These valves vent oil back into the oil sump or the pump's suction side when the oil pressure reaches a pre-set limit.

One known type of valve is described in U.S. Pat. No. 6,116,272. Therein, a pressure relief valve is integrated into the oil pump. The valve has a piston positioned within a cylindrical bore which is biased in one direction by a spring. Pressurized oil from the oil pump outlet forces the piston against the spring. As the oil pressure increases, the piston moves within the bore to a point where vents on the edges of the piston allow oil to escape back to the sump or pump.

With this type of conventional valve, the pump outlet pressure is used to determine when the valve will open to internally by-pass the excess oil from the discharge side back to the suction side. A typical valve of this type would be set to open at 7 bar.

Although such a conventional valve is simple and reliable, the pump's power consumption is relatively high as it always has to work to increase the pressure from atmospheric to 7 bar even though a lower pressure might be adequate in order to provide satisfactory lubrication of the engine components. A high power consumption equates to a reduced vehicle fuel economy, which is a disadvantage.

Another type of known pressure relief valve which is less demanding of the oil pump and therefore can give a better fuel economy is a pilot pressure relief valve. Valves of this type are described in U.S. Pat. No. 6,186,750, for example. In a similar fashion to the above-mentioned conventional relief valve, a piston, biased by a spring moves under a force provided by circulating oil. However, with the pilot-operated valve, the pilot oil pressure applied to the pilot inlet port is taken from a point inside the engine rather than the pump's outlet. Typically, a valve of this type is set to open at 4 bar. Hence, the pump outlet pressure has no effect on the valve's movement. Instead, the valve is operated by the pressure from the engine's oil gallery.

The pilot-operated valve has some disadvantages compared with the conventional one. For example, the start-up oil pressure spike is higher. The reason for this is the time delay between engine start and the pressure rise in the pilot oil feed. For engines having a cam profile switching system, this is especially problematic because the spike can cause an unwanted switch between low lift and high lift tappets. Additionally, higher amplitude pressure pulsations tend to occur at the pump outlet. These pulsations can damage engine components and are due to the time lag between changes in pump outlet pressure and pilot pressure. Further, lubrication systems incorporating pilot-operated valves also require an over-pressure relief valve at the pump outlet in order to protect the filter element. Hence, complexity and cost is added to the lubricating system.

Hence, a pressure relief valve which mitigates at least some of the above-mentioned disadvantages would be advantageous.

According to the present invention, a pressure relief valve for a lubrication system comprises a housing having a bore, first and second ends, an inlet port and an outlet port for, respectively, admitting lubricant from a high pressure side of the lubrication system into the bore and expelling it therefrom, a pilot pressure inlet port at its first end for admitting lubricant taken from a point remote from said high pressure side, and a biasing member and a piston assembly located within the bore, the piston assembly comprising a second piston biased against the first end of the housing by the biasing member and the second piston connected to a first piston and having a smaller diameter than the first piston, wherein a face of the first piston is exposed to pressure from lubricant entering the bore through the inlet port and a face of the second piston is exposed to pressure from lubricant entering the bore through the pilot pressure inlet port.

The pressure relief valve may be an integral part of an oil pump or may be a separate unit.

Compared with the known pilot-operated valve, the pressure relief valve according to the invention will open at the pre-set pressure even if the pilot oil feed has not yet seen the oil pressure, such as at initial engine start-up. Hence there is no requirement for an over-pressure relief valve. Also, engine start-up spikes and pressure pulsations are much reduced and comparable with those experienced with the conventional valve.

Under normal operating conditions, the valve according to the invention is able to keep gallery oil pressure as low as possible, thereby retaining the fuel economy benefits of the known pilot-operated valve.

BRIEF DESCRIPTION OF THE DRAWING

An embodiment of the invention will now be described, by way of example only, with reference to the drawing which is a cross-sectional view of a pressure relief valve in accordance with an embodiment of the invention.

DETAILED DESCRIPTION OF THE PREFERRED EMBODIMENT

The valve illustrated is suitable for use as a pressure relief valve in a typical lubrication system for an internal combustion engine and comprises a housing 1 having a cylindrical bore. Part of the bore has a diameter greater than the remaining portion thereof. At one end of the housing, and in the region of smaller diameter bore, there is provided a first inlet port 2 for receiving pilot pressure from an engine oil gallery. Part-way along the housing 1 in the region of larger diameter bore there is provided a second inlet port 3 for receiving oil from a pump outlet, and also an outlet port 4 which serves to vent excess oil to a sump or to the pump's suction side.

Positioned within the bore is a piston assembly which comprises first and second pistons 5, 6 joined together by a connecting rod 7. The assembly is biased by a coil spring 8. The spring 8 is located in the region of larger diameter bore between an end wall of the housing and one face of the first piston 5.

The diameter of the first piston 5 is substantially equal to that of the larger bore and is located so that it seals off the outlet port 4 from the second inlet port 3 when the spring 8 is relaxed, and allows fluid communication between these two ports when the spring 8 is compressed.

The diameter of the second piston 6 is substantially equal to that of the smaller bore and is located in the region of smaller diameter bore so that one of its faces is exposed to forces exerted by oil at the second inlet port 3 and its opposite face is exposed to forces exerted by oil at the first (pilot pressure) inlet port 2.

Operation of the valve will now be described.

As the piston 6 has a smaller diameter than the piston 5, pump outlet pressure at port 3 will generate a resultant force in the direction of arrow A, causing the spring 8 to compress. At engine start-up, even if the pilot oil feed (from the engine gallery) has no pressure, the valve will be forced to open if this resultant force exceeds the pre-set spring force. Hence, oil can vent through the outlet port 4.

Once pilot pressure has built up, the force on the spring 8 will be the vector sum of the forces brought about by the pump outlet pressure on the two pistons 5, 6 and the pilot pressure on the smaller piston 6. Hence, the opening and closing of the valve can be controlled by pilot pressure to a lesser or greater degree depending on the choice of relative sizes of the two pistons 5, 6.

The valve illustrated can be used with any type of oil pump whether a fixed flow pump or a variable flow pump. It can also be used with a mechanical, hydraulic or electronic control circuit such as a two-stage pressure control system or a fully-variable pressure control system.

What is claimed is:

1. A pressure relief valve for a lubrication system, the pressure relief valve comprising a housing having a bore, first and second ends, an inlet port and an outlet port for, respectively, admitting lubricant from a high pressure side of the lubrication system into the bore and expelling it therefrom, a pilot pressure inlet port at its first end for admitting lubricant taken from a point remote from said high pressure side, and a biasing member and a piston assembly located within the bore, the piston assembly comprising a second piston biased against the first end of the housing by the biasing member and the second piston connected to a first piston and having a smaller diameter than the first piston, wherein a face of the first piston is exposed to pressure from lubricant entering the bore through the inlet port and a face of the second piston is exposed to pressure from lubricant entering the bore through the pilot pressure inlet port, said first piston opening said outlet port when pressure from said inlet port overcomes said biasing member.

2. The pressure relief valve of claim 1 wherein said second piston moves in a direction toward said biasing member to allow flow from said inlet port to said outlet port.

3. The pressure relief valve of claim 1 wherein said second piston moves in a direction toward said first end to close said outlet port.

4. The pressure relief valve of claim 1 wherein said outlet port opens at a pre-set resultant pressure even if pressure at said pilot pressure inlet port has not seen oil pressure.

5. The pressure relief valve of claim 1 wherein said bore includes a first bore and a second bore, a diameter of said first piston substantially equal to a diameter of the second bore, a diameter of said second piston substantially equal to a diameter of the first bore.

6. The pressure relief valve of claim 1 wherein said outlet port is sealed when said biasing member is relaxed.

7. The pressure relief valve of claim 1 wherein said outlet port is open when said biasing member is compressed.

8. A relief valve comprising:
   a housing with a pilot pressure inlet port, an inlet port, and an outlet port;
   a first piston connected to a second piston, a diameter of said first piston greater than a diameter of said second piston, said first piston substantially a same diameter as a second bore and said second piston substantially a same diameter as a first bore, said first bore at a first end of said housing and containing said second piston; and
   a biasing member positioned to provide a force to close said outlet port.

9. The relief valve of claim 8 wherein said biasing member applies said force to said first piston.

10. The relief valve of claim 8 wherein said outlet port is opened when said biasing member is compressed.

11. The relief valve of claim 8 wherein said second piston moves in a direction toward said biasing member to allow flow from said inlet port to said outlet port.

12. The relief valve of claim 8 wherein said second piston moves in a direction toward said first end to close said outlet port.

* * * * *